(12) United States Patent
Kim et al.

(10) Patent No.: US 7,073,054 B2
(45) Date of Patent: Jul. 4, 2006

(54) COMPUTER SYSTEM AND METHOD FOR BOOTING UP THE SAME

(75) Inventors: In-soo Kim, Seoul (KR); Kyung-young Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 373 days.

(21) Appl. No.: 10/219,276

(22) Filed: Aug. 16, 2002

(65) Prior Publication Data

US 2003/0126427 A1     Jul. 3, 2003

(30) Foreign Application Priority Data

Jan. 3, 2002   (KR) .................................. 2002-273

(51) Int. Cl.
   G06F 15/177   (2006.01)
(52) U.S. Cl. .............. 713/2; 713/1; 713/100; 713/191; 711/113
(58) Field of Classification Search .......... 713/1, 713/2, 100, 191; 711/113
   See application file for complete search history.

(56) References Cited

U.S. PATENT DOCUMENTS

| | | | |
|---|---|---|---|
| 5,307,497 A * | 4/1994 | Feigenbaum et al. .......... 713/1 |
| 5,581,785 A * | 12/1996 | Nakamura et al. ............. 710/8 |
| 5,860,083 A * | 1/1999 | Sukegawa ................... 711/103 |
| 5,907,713 A | 5/1999 | Chen et al. |
| 6,073,232 A | 6/2000 | Krocker et al. |
| 6,195,217 B1 | 2/2001 | Park |
| 6,226,740 B1 | 5/2001 | Iga |
| 6,304,405 B1 * | 10/2001 | Asano et al. ............ 360/73.03 |
| 6,539,456 B1 * | 3/2003 | Stewart ....................... 711/113 |
| 6,721,885 B1 * | 4/2004 | Freeman et al. ................ 713/2 |
| 6,795,915 B1 * | 9/2004 | Wang ............................ 713/2 |
| 6,892,297 B1 * | 5/2005 | Aguilar et al. ................. 713/2 |
| 2004/0003223 A1 | 1/2004 | Fortin et al. |
| 2004/0064647 A1 | 4/2004 | DeWhitt et al. |

FOREIGN PATENT DOCUMENTS

| | | |
|---|---|---|
| JP | 6-314177 | 11/1994 |
| JP | 07-044325 | 2/1995 |
| JP | 8-137622 | 5/1996 |
| JP | 9-297659 | 11/1997 |
| JP | 09-297659 | 11/1997 |
| JP | 2000-173152 | 6/2000 |
| KR | 0174711 | 11/1998 |
| KR | 1999-607779 | 7/1999 |
| KR | 2001-53904 | 7/2001 |

OTHER PUBLICATIONS

Copy of an office action issued by the Japanese Patent Office on April 5, 2005 for a corresponding application.

* cited by examiner

*Primary Examiner*—Thomas Lee
*Assistant Examiner*—Vincent Tran
(74) *Attorney, Agent, or Firm*—Staas & Halsey LLP

(57) ABSTRACT

A computer system with a main memory is equipped with an HDD that has a disk and a driving motor driving the disk, a non-volatile storage unit provided in the HDD storing therein a booting program of an operating system, and a control unit reading out the booting program stored in the non-volatile storage unit and loading the booting program onto the main memory before the driving motor reaches a normal speed as power is supplied to the computer system. With this configuration, there is provided a computer system capable of reducing the booting time of the HDD.

19 Claims, 3 Drawing Sheets

COMPUTER SYSTEM AND METHOD FOR BOOTING UP THE SAME

CROSS-REFERENCE TO RELATED APPLICATIONS

This application claims the benefit of Korean Application No. 2002-273 filed Jan. 3, 2002, in the Korean Intellectual Property Office, the disclosure of which is incorporated herein by reference.

BACKGROUND OF THE INVENTION

1. Field of the Invention

The present invention relates in general to computer systems, and more particularly, to a computer system installed with an HDD and a method for booting up the same.

2. Description of the Related Art

Generally, to boot up a computer system, it takes time from when power is supplied to the computer system to when the computer system reaches an initial operating environment for a user. In another words, if power is supplied to a computer system, a central processing unit (CPU) starts to perform a POST (power on self test) routine by use of a BIOS (basic input output system). Thereafter, peripheral units of the computer system are activated for initialization and tests on the peripheral units are conducted. Subsequently, a booting program stored in a booting block of a hard disk drive (HDD) is loaded into a main memory. The CPU brings and reads the loaded booting program in the main memory, to thereby boot the computer system. There is a tendency that the booting time of a computer system is increased as an operating system of the computer system is converted into a Windows system.

The booting time is increased in a conventional computer system because it takes a long time to wake up the HDD. If power is supplied to a computer system by a user, the POST routine is performed to reset the HDD. At this time, the firmware installed within the HDD conducts a self test and then activates a spindle motor, which is a disk-driving motor of the HDD. Once the revolution per minute (RPM) of the spindle motor is at or beyond a proper predetermined number, the booting block in the HDD through the BIOS is read and loaded onto the main memory.

However, as time for the spindle motor to reach the proper number of RPMs after reset of the HDD increases, time for reading the booting block of the HDD through the BIOS correspondingly increases, thereby resulting in extending the booting time of the computer system.

SUMMARY OF THE INVENTION

An object of the present invention is to provide a computer system in which booting time of an HDD is reduced.

Additional objects and advantages of the invention will be set forth in part in the description which follows and, in part, will be obvious from the description, or may be learned by practice of the invention.

The present invention may be achieved by providing a computer system comprising a main memory and an HDD, the HDD comprising a disk and a driving motor driving the disk, a non-volatile storage unit provided in the HDD and storing therein a booting program of an operating system, and a control unit reading the booting program stored in the non-volatile storage unit and loading the booting program into the main memory before the driving motor reaches its normal speed as power is supplied to the computer system.

According to an aspect of the invention, the control unit allows the booting program to be stored in the non-volatile storage unit from the disk when installing the operating system.

According to an aspect of the invention, the non-volatile storage unit is a flash memory.

According to another embodiment, the present invention may also be achieved by providing a method of booting up a computer system comprising a main memory and an HDD, the HDD comprising a disk and a driving motor driving the disk, and a process of reading a booting program of an operating system from the disk and storing the booting program in a predetermined storage unit provided in the HDD when installing the operating system on the disk of the HDD; reading the stored booting program and loading the booting program into the main memory before the driving motor reaches its normal speed as power is supplied to the computer system; and booting up the computer system with the booting program loaded into the main memory.

According to an aspect of the invention, the storage unit is a non-volatile storage unit provided in the HDD.

BRIEF DESCRIPTION OF THE DRAWINGS

These and other objects and advantages of the invention will be more fully appreciated from the following description of the preferred embodiments taken in conjunction with the accompanying drawings, in which.

DETAILED DESCRIPTION OF THE PREFERRED EMBODIMENTS

Figure 1:
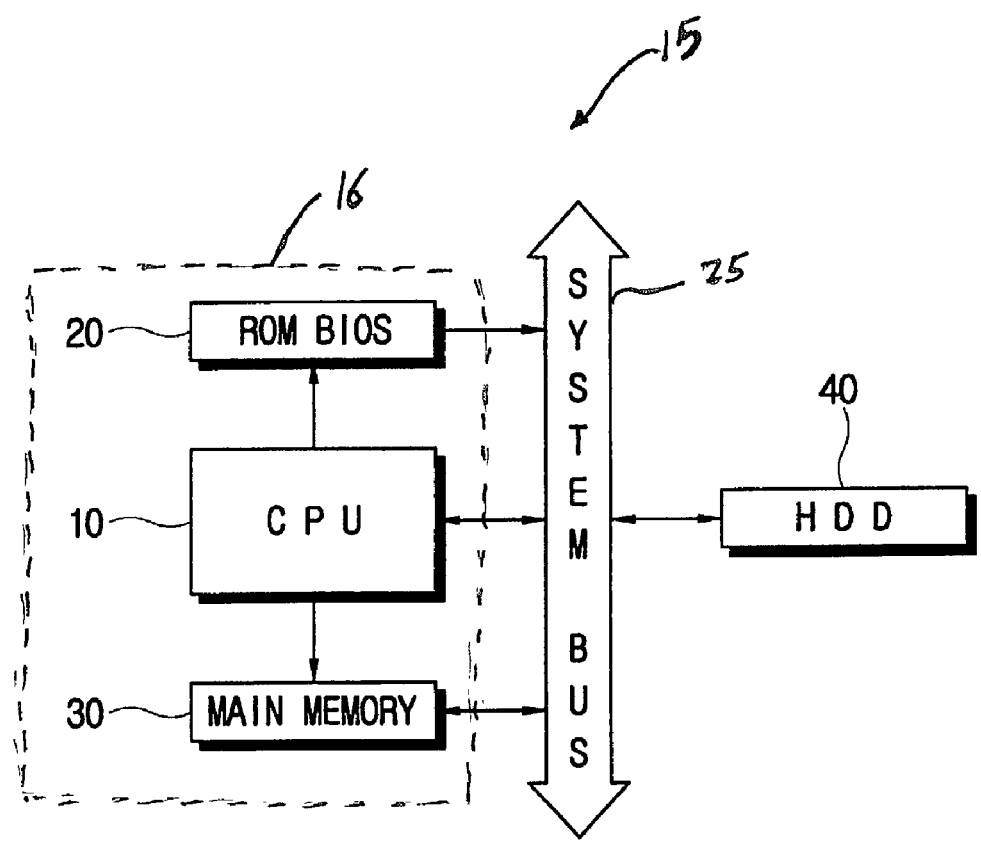
FIG. 1 is a block diagram showing a computer system according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 1, which is a block diagram showing a computer system 15 according to an embodiment of the present invention, the computer system 15 comprises a central processing unit (CPU) 10 controlling the system, a ROM BIOS 20 storing a BIOS therein, a main memory 30 which is a main storage unit, and an HDD 40, which is used as an auxiliary storage unit. The CPU 10, the ROM BIOS 20, and the main memory 30 are examples of other system components 16 of the computer system 15 and are in communication with the HDD 40 via a system bus 25. All software, including an operating system for the computer system, can be executed only after the software are loaded into the main memory 30 and read by the CPU 10. However, size of the main memory 30 is generally limited, and thus, most application programs and data are stored in the auxiliary storage unit, that is, the HDD 40. The programs and data stored in the HDD 40 are loaded onto the main memory 30 and then executed.

Figure 2:
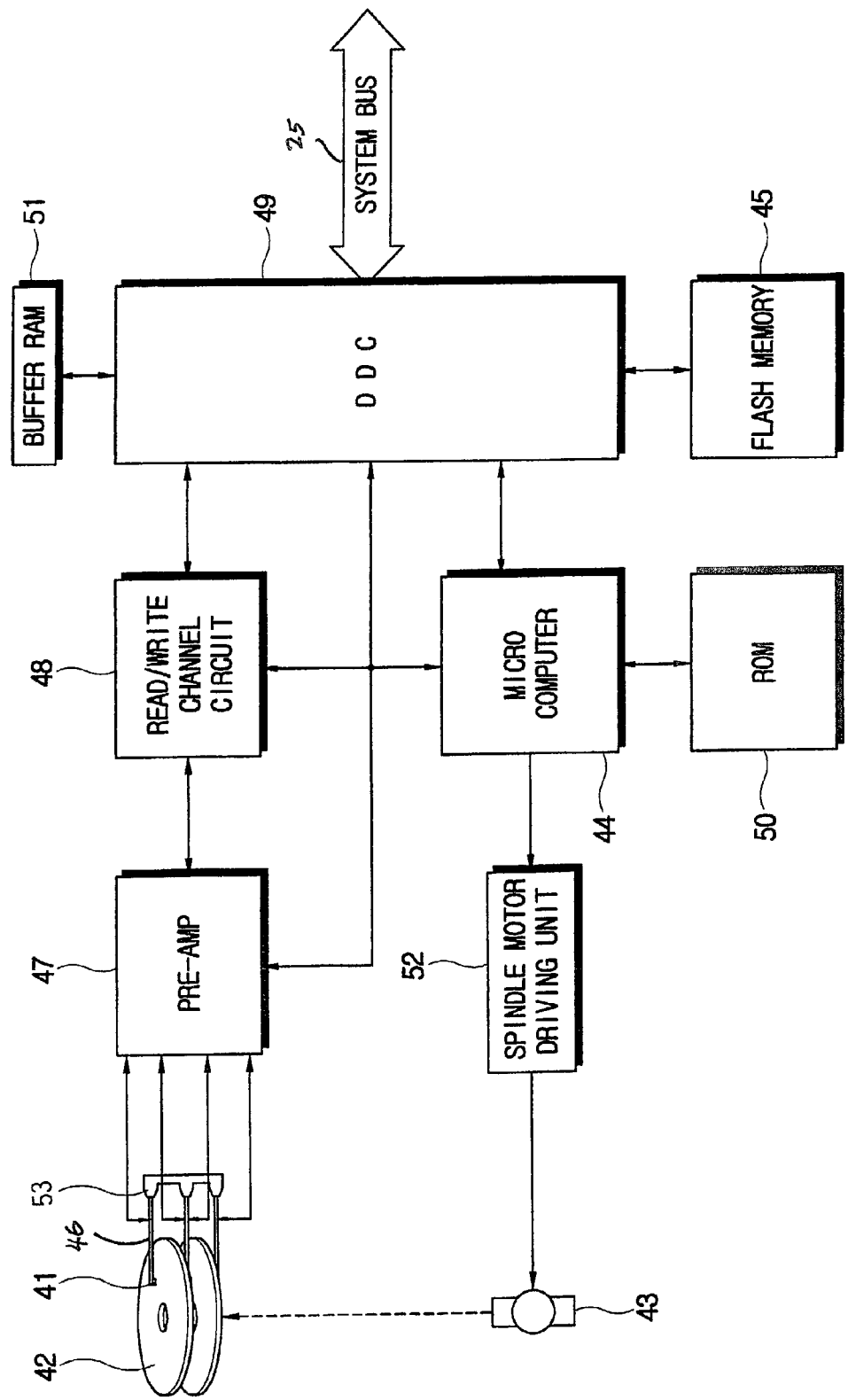
FIG. 2 is a block diagram showing an HDD of the computer system shown in FIG. 1.

Referring to FIG. 2, which is a block diagram of the HDD 40 according to the present invention, the HDD 40 is equipped with a head 41, a disk 42, a spindle motor 43, a microcomputer 44 controlling the HDD 40, a non-volatile storage unit/memory, such as flash memory 45, and a ROM 50.

The head 41 is installed on an arm 46 extended from an arm assembly 53 of a voice coil motor (not shown). The head 41 is located above a surface of the disk 42, recording and reproducing data.

The disk 42 is installed on a driving shaft of the spindle motor 43 which is a driving motor driving the disk 42, and each surface of the disk 42 corresponds with the head 41. Accordingly, if a control signal is supplied to a spindle motor driving unit 52 from the microcomputer 44 provided in the HDD 40, the spindle motor driving unit 52 activates the spindle motor 43 in response to the control signal from the microcomputer 44. Conventionally, the disk 42 is comprised of a plurality of tracks, which are arranged concentrically, and a booting block formed on the tracks store a booting program of an operating system. Also, the disk 42 includes a parking zone in which the head resides when the HDD 40 is not in use.

A preamplifier (Pre-Amp) 47 is, as shown in FIG. 2, provided adjacent to the head 41 so as to reduce distortion of a signal due to noise. In case of reading data from the disk 42, the preamplifier 47 amplifies in advance the signal picked up by the head 41 and supplies the amplified signal to a read/write channel circuit 48. Also, in case of writing data to the disk, the preamplifier 47 transmits to the head 41 encoded write data supplied from the read/write channel circuit 48 and records the encoded write data on the disk 42.

When reading from the disk 42, the read/write channel circuit 48 decodes the read signal supplied from the preamplifier 47 to thereby generate the read data and then transmits the read data to a disk data controller 49 (hereinafter referred to as "DDC"). When writing to the disk 42, the read/write channel circuit 48 encodes data supplied from the DDC 49 and supplies the encoded data to the preamplifier 47. The DDC 49 interfaces communications between the other system components 16 of the computer system 15 and the microcomputer 44 of the HDD 40 through the system bus 25.

The DDC 49 records the data received from the other system components 16 of the computer system 15 on the disk 42 through the read/write channel circuit 48 and the preamplifier 47, or transmits the data reproduced from the disk 42 to the other system components 16.

The microcomputer 44 controls the HDD 40. The microcomputer 44 controls the DDC 49 in response to a command of reading and writing the data received from the other system components 16 hosting the microcomputer 44, and controls track search and track trace of the disk 42. Therefore, the microcomputer 44 controls the DDC 49 to store the booting program in the booting block of the disk 42 when the operating system is installed, and then store the booting program in the flash memory 45. The microcomputer 44 can determine whether the spindle motor 43 has reached its normal speed when the system is booted up. In a case where the microcomputer 44 determines that the spindle motor 43 has not reached its normal speed, the booting program stored in the flash memory 45 is transmitted to the other system components 16 through the system bus 25 and then loaded onto the main memory 30. Here, a control program for the microcomputer 44 is stored in the ROM 50.

A buffer RAM 51 connected to the DDC 49 can temporarily store therein the data transmitted between the disk 42 and the other system components 16 under control of the DDC 49 to thereby increase transmission efficiency.

The flash memory 45 stores therein the booting program. Flash memory 45 size may vary depending upon size of the booting program of the operating system. The flash memory 45 can be a non-volatile memory, for which the booting program can be stored in a safe manner even if power of the computer system 15 is abruptly turned off.

Figure 3:
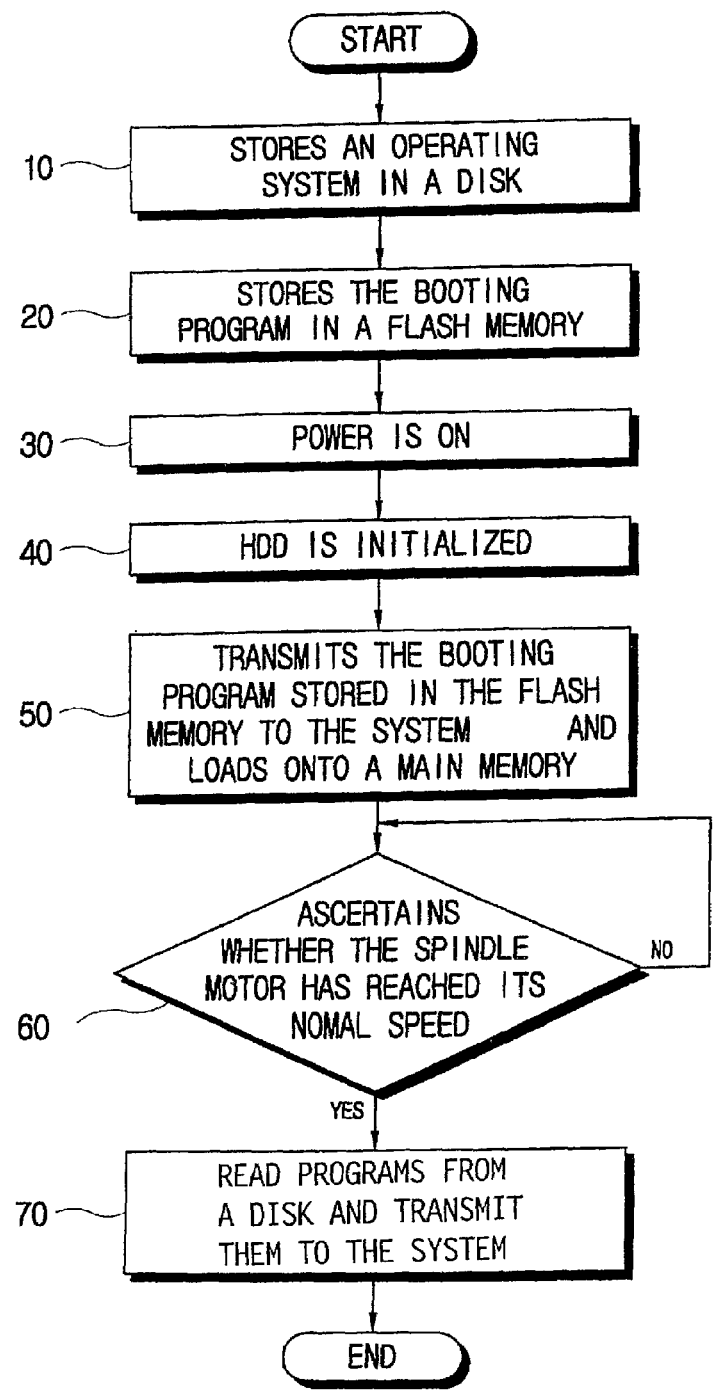
FIG. 3 is a flow chart explaining an operation of the computer system shown in FIG. 1.

Referring to FIG. 3, an operation of the computer system 15 equipped with the HDD 40 along with the configuration as described so far will be described. At operation 10, if an operating system is installed as power is applied to the computer system 15, the microcomputer 44 stores the operating system program in a specified block on the disk 42 according to a control signal from the other system components 16. Of the stored/installed operating system program, any portion relevant to booting of the computer system 15 is stored in a booting block on the disk 42. The microcomputer 44 determines whether the booting program is stored in the flash memory 45. Because the microcomputer 44 is capable of locating the booting block of the disk 42, in a case where the booting program is not stored in the flash memory 45, at operation 20, the microcomputer 44 stores the booting program, stored in the disk 42 during the installation of the operating system, in the flash memory 45. The booting program stored in the flash memory 45 is not changed as long as the booting program of the operating system is not changed. If the booting program of the operating system is changed, the microcomputer 44 can update the booting program stored in the flash memory 45.

At operation 30, when power is supplied to the computer system 15 after the booting program is stored in the flash memory 45, at operation 40 the HDD 40 is first initialized by the ROM BIOS 20. Accordingly, the microcomputer 44 reads the booting program stored in the flash memory 45 and transmits the read booting program to the other system components 16 through the system bus 25, and then at operation 50 the booting program is loaded into the main memory 30.

In a conventional computer system, when a conventional HDD is initialized after power is applied to the computer system, a spindle motor (not shown) inherently installed in the conventional HDD is driven. After the spindle motor reaches its normal speed, a microcomputer (not shown) reads the booting program from a disk (not shown) and transmits the booting program to the computer system, thereby booting up the computer system. However, in the computer system 15 according to the present invention, since the booting program to be read from the disk 42 has been stored in a flash memory 45 provided inside the HDD 40, the user does not need to wait until the spindle motor 43 of the HDD 40 reaches its normal speed, thereby shortening the booting time of the computer system 15. More particularly, because in case of Windows operating systems booting times tend to be long and HDD wake up times further increase the booting times, bypassing HDD wake up times advantageously helps shorten the booting times in case of Windows operating systems. More particularly, at operation 60, the microcomputer 44 determines whether the spindle motor 43 has reached its normal speed. At operation 60, when the spindle motor 43 reaches its normal speed, at operation 70 the microcomputer 44 reads any other necessary programs and data from the disk 42 and transmits them to the other system components 16 of the computer system 15.

With this configuration, the computer system 15 according to the present invention enables the time consumed in reading the booting program after power is supplied to the computer system to be innovatively reduced. More particularly, as described above, to boot up the computer system 15 quicker than the conventional computer system, a booting program is stored in the flash memory 45 and the booting program stored in the flash memory 45 is transmitted to the other system components 16 of the computer system 15 through the system bus 25 before the spindle motor 43 reaches its normal speed, thereby allowing the booting time to be shortened. As described above, according to the present invention a computer system capable of reducing the booting time of the HDD is provided.

In an embodiment with regard to the computer system according to the present invention, the flash memory has been described to be a non-volatile storage unit as a way of example. However, the present invention can be applied to a storage unit as long as it can retain the contents stored therein although power is abruptly off.

In an embodiment with regard to the computer system according to the present invention, the spindle motor has been described to be a driving motor of the disk as a way of example. However, the present invention can also be applied to a different motor installed with a disk.

Although the preferred embodiment of the present invention has been disclosed for illustrative purposes, those skilled in the art will appreciate that various modifications, additions and substitutions are possible, without departing from the scope and spirit of the invention, the scope which is defined in the claims and their equivalents.

What is claimed is:

1. A computer system, comprising:
   a main memory; and
   a disk drive in communication with the main memory and comprising:
      a driving motor driving a disk of the disk drive;
      a non-volatile storage unit storing a booting program of an operating system; and
      a control unit reading the booting program stored in the non-volatile storage unit and loading the booting program onto the main memory before the driving motor reaches a normal speed as power is supplied to the computer system.

2. The computer system according to claim 1, wherein the control unit stores the booting program in the non-volatile storage unit from the disk when installing the operating system.

3. The computer system according to claim 1, wherein the non-volatile storage unit is a flash memory.

4. A method of booting up a computer system, comprising:
   reading a booting program of an operating system from a disk of the disk drive;
   storing the booting program in a predetermined storage unit in the disk drive when installing an operating system on the disk of the disk drive;
   reading the stored booting program and loading the booting program onto a main memory of the computer system before a driving motor of the disk drive reaches a normal speed as power is supplied to the computer system; and
   booting up the computer system with the booting program loaded onto the main memory.

5. The method according to claim 4, wherein the storage unit is a non-volatile storage unit.

6. A computer system, comprising:
   a main memory; and
   a disk drive in communication with the main memory and comprising:
      a driving motor driving a disk of the disk drive;
      a storage unit storing a booting program of the computer system; and
      a control unit loading the booting program stored in the storage unit into the main memory before the driving motor reaches abnormal speed when power is supplied to the computer system.

7. The computer system of claim 6, wherein the storage unit is non-volatile.

8. The computer system of claim 7, wherein the non-volatile storage unit is flash memory.

9. The computer system of claim 6, wherein the control unit updates the booting program stored in the storage unit.

10. The computer system of claim 6, wherein the control unit stores the booting program in the storage unit during installation of an operating system for the computer system.

11. A computer hard disk drive having a disk, comprising:
    a driving motor driving the disk;
    a storage unit storing a booting program of a computer system controlling the disk drive;
    a controller in communication with the computer system and transmitting the booting program to the computer system before the driving motor reaches a normal speed when power is supplied to the computer system.

12. The computer hard disk drive of claim 11, wherein the storage unit is nonvolatile.

13. The computer hard disk drive of claim 12, wherein the non-volatile storage unit is flash memory.

14. The computer hard disk drive of claim 12, wherein the controller updates the booting program stored in the storage unit.

15. The computer hard disk drive of claim 14, wherein the controller stores the booting program on the disk and the controller updates the booting program in the storage unit responsive to changes in the booting program stored on the disk.

16. The computer hard disk drive of claim 12, wherein the controller stores the booting program in the storage unit during installation of an operating system for the computer system on the disk of the disk drive.

17. The computer hard disk drive of claim 16, wherein the controller installs the operating system on the disk of the disk drive responsive to commands from the computer system.

18. A controller controlling a computer-system hard disk drive having a disk and in communication with other components of the computer system, the controller storing a process of:
    storing a booting program in a memory in the hard disk drive; and
    loading the booting program into a main memory of the computer system before a driving motor driving the disk of the hard disk drive reaches a normal speed as power is supplied to the computer system.

19. The controller of claim 18, wherein the process further comprises:
    storing the booting program of the computer system on the disk of the hard disk drive responsive to commands from the other components of the computer system; and
    updating the booting program in the memory from the disk.

* * * * *

UNITED STATES PATENT AND TRADEMARK OFFICE
CERTIFICATE OF CORRECTION

PATENT NO. : 7,073,054 B2
APPLICATION NO. : 10/219276
DATED : July 4, 2006
INVENTOR(S) : In-soo Kim et al.

It is certified that error appears in the above-identified patent and that said Letters Patent is hereby corrected as shown below:

Column 6, Line 6, change "abnormal" to --a normal--.

Column 6, Line 27, change "nonvolatile." to --non-volatile--.

Signed and Sealed this

Sixteenth Day of January, 2007

JON W. DUDAS
*Director of the United States Patent and Trademark Office*